United States Patent
Mora Flores

(10) Patent No.: US 11,135,800 B2
(45) Date of Patent: Oct. 5, 2021

(54) FLEXIBLE PACKAGE-FORMING MACHINE FOR HORIZONTAL PACKAGING BY MEANS OF FOLDING AND WELDING A FLEXIBLE BAND AND METHOD

(71) Applicant: MESPACK, SL, Santa Perpetua de Mogoda (ES)

(72) Inventor: Francisco Mora Flores, Mollet del Valles (ES)

(*) Notice: Subject to any disclaimer, the term of this patent is extended or adjusted under 35 U.S.C. 154(b) by 28 days.

(21) Appl. No.: 16/607,693

(22) PCT Filed: Mar. 7, 2018

(86) PCT No.: PCT/EP2018/055540
§ 371 (c)(1),
(2) Date: Oct. 23, 2019

(87) PCT Pub. No.: WO2018/197085
PCT Pub. Date: Nov. 1, 2018

(65) Prior Publication Data
US 2020/0130316 A1    Apr. 30, 2020

(30) Foreign Application Priority Data
Apr. 24, 2017  (EP) ..................................... 17382217

(51) Int. Cl.
*B31B 70/10*    (2017.01)
*B31B 70/26*    (2017.01)
(Continued)

(52) U.S. Cl.
CPC .............. *B31B 70/10* (2017.08); *B29C 65/16* (2013.01); *B29C 65/7473* (2013.01);
(Continued)

(58) Field of Classification Search
CPC ..... B31B 70/10; B31B 70/262; B31B 70/642; B31B 70/844; B31B 70/148;
(Continued)

(56) References Cited

U.S. PATENT DOCUMENTS 6,195,967 B1* 3/2001 Todd .......................... B65B 1/02
53/562
2002/0088094 A1* 7/2002 Barclay ................ B65D 33/255
24/30.5 R
(Continued)

FOREIGN PATENT DOCUMENTS

EP           2730401 A2 * 5/2014 ............. B65B 61/06

*Primary Examiner* — Dariush Seif
*Assistant Examiner* — Luis G Del Valle
(74) *Attorney, Agent, or Firm* — Eugenio J. Torres-Oyola; Victor M. Rodriguez-Reyes; Rafael Rodriguez-Muriel

(57) ABSTRACT

A machine comprising: a flexible band (1) unwinding unit (11), a flexible band (1) folding unit (14), a drive unit (31) for moving the flexible band (1) in a forward movement direction (DA), a welding unit (16) and a laser beam cutting unit (53) for separating each individual flexible package from the flexible band (1) and for providing a fill opening in each flexible package by at least one fill opening cut, the laser beam cutting unit (53) having associated therewith a separator device, movable in a vertical direction and including an insertable separator element (41), interposed between the opposite faces of the folded flexible band (1), in an area adjacent to the fill opening (3), for separating the opposite faces of the flexible band (1) during cutting operations to prevent the fusion thereof.

5 Claims, 3 Drawing Sheets

(51) Int. Cl.
  *B31B 70/64* (2017.01)
  *B31B 70/84* (2017.01)
  *B31B 70/14* (2017.01)
  *B31B 70/00* (2017.01)
  *B31B 70/16* (2017.01)
  *B29C 65/16* (2006.01)
  *B29C 65/74* (2006.01)
  *B29C 65/78* (2006.01)
  *B29C 65/00* (2006.01)
  *B31B 155/00* (2017.01)
  *B31B 160/10* (2017.01)
  *B29L 31/00* (2006.01)

(52) U.S. Cl.
  CPC ........ *B29C 65/7841* (2013.01); *B29C 66/004* (2013.01); *B29C 66/0014* (2013.01); *B29C 66/0346* (2013.01); *B29C 66/24244* (2013.01); *B29C 66/431* (2013.01); *B31B 70/003* (2017.08); *B31B 70/148* (2017.08); *B31B 70/16* (2017.08); *B31B 70/262* (2017.08); *B31B 70/642* (2017.08); *B31B 70/844* (2017.08); *B29C 2791/009* (2013.01); *B29C 2793/009* (2013.01); *B29L 2031/7129* (2013.01); *B31B 2155/0014* (2017.08); *B31B 2160/10* (2017.08)

(58) Field of Classification Search
  CPC ................. B31B 70/003; B31B 70/16; B31B 2155/0014; B31B 2160/10; B31B 70/02; B31B 70/04; B31B 70/14; B31B 70/144; B31B 70/20; B31B 70/36; B29C 65/16; B29C 65/7473; B29C 65/7841; B29C 66/0014; B29C 66/004; B29C 66/0346; B29C 66/24244; B29C 66/431; B29C 2791/009; B29C 2793/009; B29L 2031/7129
  USPC ........................................................ 493/189
  See application file for complete search history.

(56) References Cited

U.S. PATENT DOCUMENTS

2013/0040796 A1* 2/2013 Thies ................... B23K 26/382
                                                    493/239
2014/0360139 A1* 12/2014 Honegger .............. B65B 39/06
                                                    53/492
2019/0054564 A1* 2/2019 Roose ................... B23K 26/38

* cited by examiner

FLEXIBLE PACKAGE-FORMING MACHINE FOR HORIZONTAL PACKAGING BY MEANS OF FOLDING AND WELDING A FLEXIBLE BAND AND METHOD

FIELD OF THE ART

The present invention relates to a flexible package-forming machine for horizontal packaging by means of folding and welding a flexible band, in which a laser cutting unit is used for making cuts in areas of the flexible band for separating each flexible package.

The invention also proposes a method for forming flexible packages for horizontal packaging by means of folding and welding a flexible band.

STATE OF THE ART

The use of laser technology applied to the cutting of a flexible band intended for forming flexible packages is known, for example, through patent document WO 2016002667, in which the use of a laser cutting unit is envisaged for making continuous or discontinuous cuts in an area corresponding to a seal-rupture part.

Patent document AU 2015293507 also discloses the use of a laser device for making a cut to form a handle, in a bag-forming package made of plastic material, close to a bag sealing area.

Patent document JP2014080215 describes a processing unit for processing a sheet-like band supported between two rollers by means of laser, in which means for reducing the heat derived from laser irradiation on said sheet-like band are considered.

BRIEF DESCRIPTION OF THE INVENTION

According to a first aspect, the present invention relates to a flexible package-forming machine for horizontal packaging by means of folding and welding a flexible band.

Machines of this type are used for obtaining, based on handling a band made of a flexible material, individual flexible packages ready to be filled and sealed.

The reference to horizontal packaging means that the flexible packages obtained form, before separation thereof by means of cutting performed by a cutting unit, a horizontal band of laterally connected flexible packages, each of them defining a closed enclosure in its bottom half and provided with a fill opening in its top half, thereby allowing individual filling of each flexible package by pouring the content through said fill opening before or after said separation by means of cutting.

The handling of the flexible band for obtaining flexible packages basically consists of a folding operation so that parts of one and the same face of the flexible band are arranged opposite one another, thereby defining an open conduit in its top half, subsequent welding of the opposite parts of the flexible band subdividing said conduit into packages that are open, at least partially, in their top half, and finally separating the flexible packages by means of cutting which can be performed before or after filling.

The proposed forming machine comprises, in this order with respect to a forward movement direction of the flexible band at least:
- one unwinding unit for unwinding a flexible band in the forward movement direction;
- one folding unit of a flexible band configured for folding said flexible band along at least one folding line parallel to the forward movement direction, at least two portions arranged on opposite sides of said at least one folding line of one and the same face of the flexible band being arranged opposite one another;
- one welding unit of the folded flexible band configured for making welding lines at least in a direction transverse to the forward movement direction of the flexible band;
- one cutting unit for cutting the folded flexible band to separate the portions making up the flexible packages;

and wherein the forming machine further includes at least one drive unit configured for moving the flexible band in the forward movement direction;

Rolls of flexible band will be fed to the unwinding unit and the rotation thereof can be operated by means of a motor. Said rolls can be printed rolls or the machine can include a printing unit if printed motifs are to be included on the flexible packages.

The folding unit can be of many different natures, although it will preferably consist of a forming triangle defining two converging edges around which the flexible band slides, the folding thereof being performed by way of transition between a flat shape and a folded shape. It is also contemplated for the folding unit to have a more complex geometry, provided with more edges, making a W-shaped fold, for example, along three folding lines parallel to the forward movement direction of the flexible band, thereby obtaining flexible packages provided with a base suitable for keeping the package upright.

Also in an illustrative and non-limiting manner, the welding unit can also consist of hot clamps configured for pressing the flexible band in pre-established precise positions long enough so that the heat of said hot clamps partially melts the material of the opposite parts of the flexible band, causing the welded attachment thereof.

The forming machine can furthermore integrate other units such as a filling unit of the flexible packages provided for depositing a precise amount of product into each flexible package through a fill opening provided in its top half, or a sealing unit configured for sealing said fill opening after filling.

The present invention proposes for the cutting unit to be a laser cutting unit provided for making cuts in a cutting area of the folded flexible band, separating each individual flexible package from the flexible band from which it has been formed, and providing a fill opening in each flexible package by means of at least one fill opening cut.

Said cutting unit will at least be provided with:
- at least one emitting unit for emitting laser light located on one side of the folded flexible band; and
- a directional device for directing the laser light against a cutting area of said folded and welded flexible band;

according to the proposal of this invention, the following has been additionally provided:
- at least one immobilizing clip configured for pressing along a portion of the folded flexible band adjacent to the cutting area for the immobilization thereof; and
- a separator device including an insertable separator element interposed between the opposite faces of the folded flexible band, in an area adjacent to the fill opening, for separating the opposite faces of the flexible band during cutting operations to prevent the fusion thereof;

The mentioned separator element is movable in a vertical direction not parallel to the forward movement direction of the flexible band between an inserted position in which the separator element is inserted between the opposite faces of the folded flexible band through edges of the flexible band farthest away from the folding line up to a position adjacent to the cutting area of the fill opening cut, and an extracted position in which the separator element does not interfere with the welding lines of the flexible band in the movement thereof in the forward movement direction.

According to one embodiment, the emitting unit for emitting laser light will be located on one side of the flexible band and, by means of the directional device, the emitted laser light beam will be directed and aimed against a cutting area of the flexible band located on one of the sides of the folded flexible band. Said directional device will be in charge of moving the laser light beam following a pre-established precise pattern corresponding to the cutting line, cutting the folded flexible band. Typically, the directional device will consist of a moving mirror precisely operated by motors or servomotors. A programmable control device will be in charge of controlling the movement of said mirror and the actuation of the emitting unit for emitting laser light in coordination with the rest of the forming machine.

The laser light beam will go through the at least two layers of flexible band that are superimposed after folding, cutting all the layers from a single side.

If the superimposed layers of flexible band are in contact at the moment of cutting, this feature will cause the possibility of said layers being attached to one another as a result of fusion due to the heat produced by the laser light beam. For that reason, in those areas in which the cut is made for obtaining a fill opening of the produced flexible package through which a product is poured into said package, before making the cut there is a need to assure that the opposite layers of the flexible band are not in contact with one another, thereby preventing cutting by means of laser light beam from being able to cause the fusion thereof.

To achieve said separation of the layers, said at least one immobilizing clip is used together with the separator device.

The immobilizing clip presses the folded flexible band from opposite sides thereof like a clamp, preferably in positions adjacent to the entire length of the cutting area in which the cut will be made. Said immobilizing clip will fix the position of the cutting area of the flexible band with respect to the emitting unit for emitting laser light, thereby assuring that the cut will be made correctly and precisely.

The two side edges of the flexible band farthest away from the folding line will coincide on the upper edge of the folded flexible band. At least one part of said upper edge of the folded flexible band will not be welded by the welding unit, which allows inserting therethrough the mentioned separator element, which will be introduced between the two opposite layers of the folded flexible band, separating them.

Said separator element will therefore be movable in a direction not parallel to the forward movement direction of the flexible band, allowing the insertion thereof from top to bottom until reaching an inserted position in which the separator element is arranged adjacent to or superposed on the cutting area corresponding to the fill opening cut.

If it is arranged adjacent to said cutting area, the at least two opposite layers of the flexible band will be spaced apart, thereby allowing the laser light beam to cut both layers going through the space separating them without causing the fusion thereof.

In contrast, if the separator element coincides with said cutting area, it will act like a mask that will interfere with said laser light beam, blocking it, and it will prevent the laser light beam from going through said separating space, only one of the layers of the folded flexible band thus being cut.

The separator element will also be movable in a direction opposite the direction of insertion movement, allowing the extraction thereof after the tasks of cutting have been performed such that the separator element does not interfere with the movement of the flexible band or of the flexible package obtained from cutting in the forward movement direction, particularly not interfering with the welding lines joining the two layers of the folded flexible band.

Preferably, the movement of the separator element will be a movement perpendicular to the forward movement direction, for example, a vertical movement.

According to a proposed embodiment, the separator device further includes a guide element which is inserted between the opposite faces of the folded flexible band in an area adjacent to the edges of the flexible band farthest away from the folding line, causing the separation thereof to make the insertion of the separator element between the opposite faces of the flexible band easier.

Said guide element acts like a keel that is interposed between the two layers of the flexible band in the area thereof adjacent to the side edges of the flexible band farthest from the folding line, separating them, thus making the insertion of the separator element between both easier.

Preferably, said guide element will be located before the separator element in the forward movement direction of the flexible band, such that the movement of the flexible band in the forward movement direction take place with the guide element inserted at all times between the two layers of the flexible band. This allows for said guide element to be inserted between the two layers only when putting the forming machine in operation and for said guide element to always remain inserted between the two layers of the flexible band without it ever being extracted.

Additionally, it is proposed for the guide element to be movable in a direction parallel to the forward movement direction of the flexible band between an insertion position in which one end of the guide element is adjacent to the separator element and in which at least part of the guide element coincides with a cutting area, and a cutting position in which the guide element is spaced apart from the cutting area.

This back and forth movement of the guide element parallel to the forward movement direction of the flexible band does not cause said guide element to be extracted from between the two layers of the flexible band, rather it serves to move one end of the mentioned guide element closer to the area for inserting the separator element between the two layers of the folded flexible band, making it easier to correctly introduce the end of said separator element between both layers as they are separated by the guide element.

With the guide element in the insertion position described above, a part of said guide element can be arranged coinciding with a cutting area, which would prevent the light beam from cutting the two superimposed layers of the flexible band since the guide element is interposed therebetween. For this reason, when the insertion of the separator element has already been completed, the guide element is moved, moving away from the separator element in a direction parallel to the forward movement direction of the flexible band, being arranged outside the cutting area, but without coming out from between the two opposite layers of the flexible band.

It is also proposed for said at least one immobilizing clip to support gas ducts connected to blow openings aimed at said cutting area. The immobilizing clips themselves will thereby provide a gas curtain over the cutting area, which can be inert gas or air, for example, preventing flame from being generated during cutting operations and discharging the generated vapors.

Additionally, a suction hood for suctioning said generated vapors can be provided above or around the cutting area for collecting and extracting said vapors.

According to a second aspect, the present invention relates to a flexible package-forming method for horizontal packaging by means of folding and welding a flexible band, comprising the following steps:

feeding a flexible band, by means of an unwinding unit for unwinding a flexible band, to a flexible package-forming machine in the forward movement direction;

driving said flexible band in the forward movement direction;

folding, by means of a folding unit, said flexible band along at least one folding line parallel to the forward movement direction, at least two portions arranged on opposite sides of said at least one folding line of one and the same face of the flexible band being arranged opposite one another, obtaining a folded flexible band;

welding, by means of a welding unit arranged after the folding unit in the forward movement direction, the folded flexible band along at least welding lines that are spaced apart and transverse to the forward movement direction of the flexible band; and cutting the folded and welded flexible band for obtaining individual flexible packages;

Furthermore, and according to this invention, it is proposed for the step of cutting the flexible band to include the following sub-steps:

immobilizing, by means of at least one immobilizing clip, a cutting area of the flexible band in which the cuts are to be made, retaining the flexible band between opposite parts of said immobilizing clip along a portion of the folded flexible band adjacent to the cutting area;

inserting a separator element of a separator device between the opposite faces of the folded flexible band by means of the movement thereof in a vertical direction not parallel to the forward movement direction of the flexible band up to an inserted position adjacent to the cutting area of the fill opening cut, said insertion between the opposite faces of the folded flexible band taking place through edges of the flexible band farthest away from the folding line;

emitting a laser light beam, by means of at least one emitting unit for emitting laser light located on one side of the flexible band, and aiming said laser light beam against a cutting area of said folded flexible band by means of a directional device for directing the laser light, moving said laser light beam along pre-established cutting lines;

moving the separator element away to a retracted position in which the separator element does not interfere with the welding lines of the flexible band in the movement thereof in the forward movement direction;

moving the produced flexible package away by means of a translation device after releasing the immobilization caused by the immobilizing clip;

moving the flexible band in the forward movement direction, placing a new portion of the flexible band corresponding to a flexible package in the cutting area.

Said method will be implemented by the forming machine described above in the first aspect of the invention.

The immobilization of the flexible band by the immobilizing clip will fix the cutting area in a precise, obstacle-free position between said cutting area and the directional device for directing the laser light beam of the cutting unit.

The movement of the separator element will then allow the insertion thereof between the two side edges of the flexible band farthest away from the folding line, separating the two layers forming the folded flexible band, separating them.

The cut will then be made by means of activating the emitting unit for emitting laser light and by means of the control of a directional device, for example, using a programmable control device integrating a computer, or a PLC, following a pre-established cutting pattern corresponding with said cutting area.

As a result of said cutting operation, a flexible package will be separated from the folded flexible band, and a fill opening will be made on said flexible package.

The separator element will be moved away to a retracted position, and if flexible band trimmings exist, they will be disposed of, and the flexible band will be moved in the forward movement direction after releasing the immobilizing clip, placing a portion corresponding to a new flexible package at the cutting area to restart the cycle of the cutting operation.

In a preferred embodiment, it is proposed for a guide element to be inserted between the opposite faces of the folded flexible band in an area adjacent to the edges of the flexible band farthest away from the folding line prior to the cutting area in the forward movement direction, causing the separation thereof to make the insertion of the separator element between the opposite faces of the flexible band easier. This guide element has been described in the first aspect of the invention.

Like in the first aspect of the invention, in this second aspect of the invention it is furthermore proposed for the guide element to move in a direction parallel to the forward movement direction of the flexible band between an insertion position in which one end of the guide element is adjacent to the separator element and in which at least part of the guide element coincides with a cutting area, and a cutting position in which the guide element does not coincide with any cutting area, the insertion of the separator element taking place with the guide element in the insertion position, and the cutting of the flexible band taking place with the guide element in the cutting position.

According to another additional embodiment, it is proposed to blow gas against the cutting areas through blow openings aimed at said cutting area during the step of cutting, said blow openings being connected to gas ducts and supported in said at least one immobilizing clip, which prevents the occurrence of flame and dissipates the generated vapors, which can optionally be absorbed by means of an absorption hood.

It will be understood that references to geometric position, such as for example, parallel, perpendicular, tangent, etc. allow deviations of up to ±5° with respect to the theoretical position defined by said nomenclature.

Other features of the invention will be seen in the following detailed description of an embodiment.

BRIEF DESCRIPTION OF THE DRAWINGS

The foregoing and other advantages and features will be more clearly understood based on the following detailed description of an embodiment in reference to the attached drawings which must be interpreted in an illustrative and non-limiting manner, in which.

DETAILED DESCRIPTION OF AN EMBODIMENT

The attached drawings show illustrative, non-limiting embodiments of the present invention.

Figure 1:
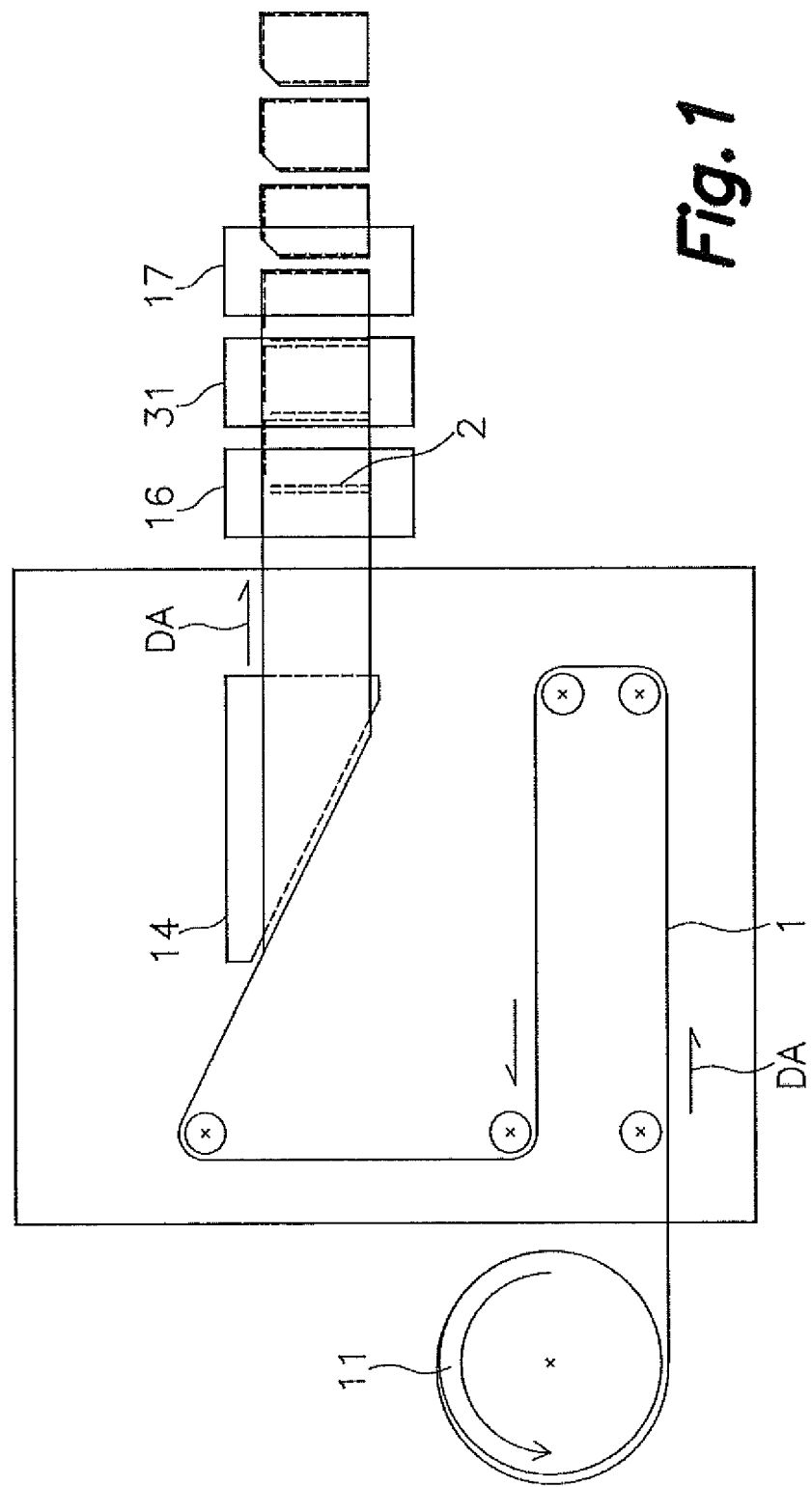
FIG. 1 shows a schematic side view of the proposed forming machine.
Figure 2:
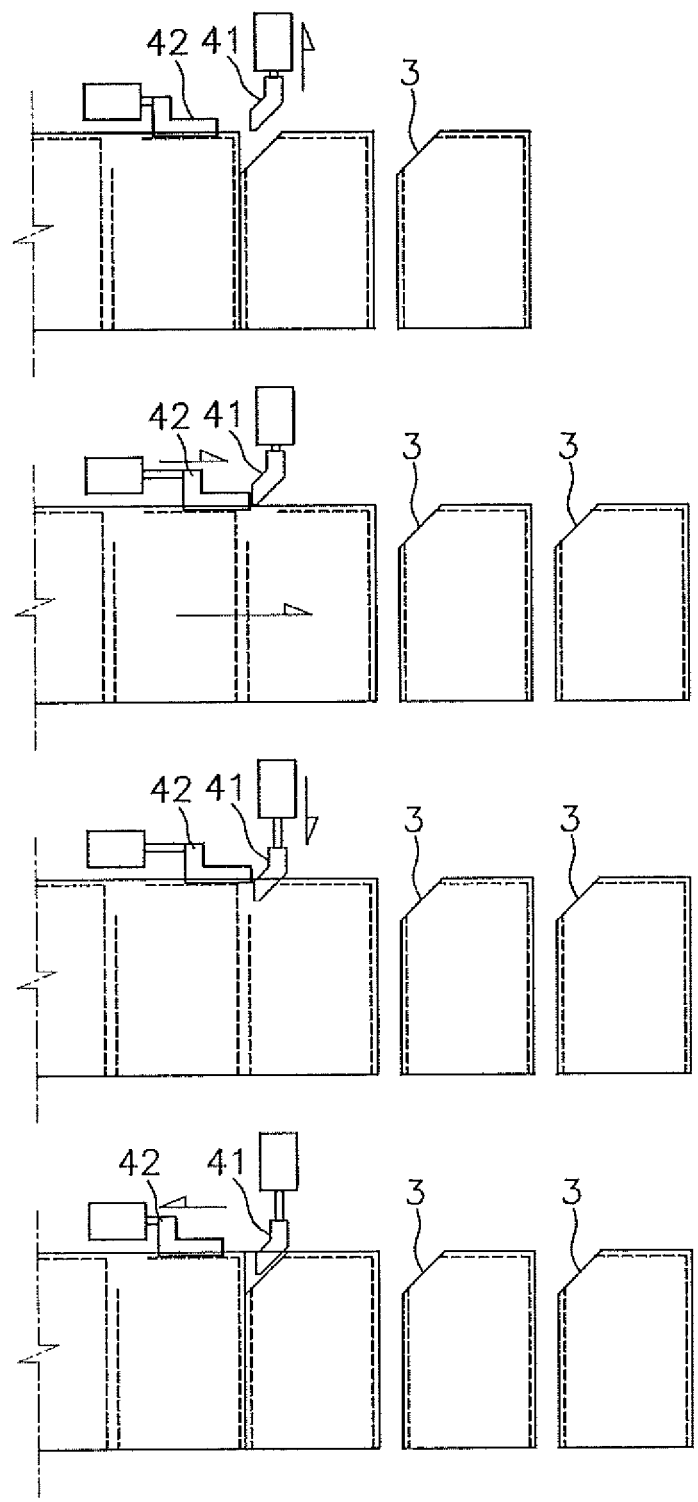
FIG. 2 schematically shows four steps of the proposed laser cutting method, showing the positions of the separator element and the guide element in each of said steps.

FIG. 1 shows a first embodiment of the present invention relating to a flexible package-forming machine for horizontal packaging by means of folding and welding a flexible band.

Said package-forming machine consists of:
an unwinding unit 11 for unwinding a flexible band 1 in the forward movement direction DA;
a folding unit 14 of a flexible band 1 configured for folding said flexible band 1 along at least one folding line parallel to the forward movement direction DA, at least two portions arranged on opposite sides of said at least one folding line of one and the same face of the flexible band 1 being arranged opposite one another;
a welding unit 16 of the folded flexible band 1 configured for making welding lines 2 at least in a direction transverse to the forward movement direction of the flexible band 1;
a cutting unit 17 for cutting the folded flexible band 1 to separate the portions making up the flexible packages;
and wherein the forming machine further includes at least one drive unit 31 configured for moving the flexible band 1 in the forward movement direction DA.

The mentioned cutting unit 17 is a laser cutter including an emitting unit 51 for emitting laser light, a directional device 52 for directing a laser light beam 53 formed by a moving mirror operated by servomotors controlled by a programmable control device, according to well-known technique.

The cutting unit 17 further includes two immobilizing clips 43 configured for pressing along a portion of the folded flexible band 1 adjacent to the cutting area for the immobilization thereof, said two immobilizing clips 43 being parallel to the cutting lines.

Each of the two clips 43 integrates a gas (for example, air) duct with blow openings 44 aimed towards the cutting area, said duct being connected to a gas source, which allows creating a gas curtain around the cutting area which prevents the occurrence of flame during the task of cutting by means of the moving laser light beam 53.

A suction hood (not illustrated) is further included above the cutting area for collecting the vapors generated during the tasks of cutting, a product resulting from burning plastic.

To prevent cutting by means of the laser light beam 53 from causing the welding of the opposite layers of the folded flexible band 1 in the area of the fill opening 3, which would prevent subsequent filling of the produced flexible package, or the insertion of an valve for opening/closing in said area of the package, the cutting unit also includes a separator device keeping the two layers of the flexible band 1 separated during the tasks of cutting.

Said separator device consists of a guide element 42 and a separator element 41.

The guide element 41 is movable in a direction parallel to the forward movement direction of the flexible band, driven by means of a piston or linear motor. Said guide element 41 consists of a flat coplanar with the folded flexible band 1, with a lower edge parallel to the forward movement direction, partially inserted between the two layers of the folded flexible band 1, separating the two side edges of the flexible band farthest from the folding line. The movement of the flexible band 1 in the forward movement direction causes the two side edges of the flexible band 1 to separate surrounding the guide element 42, without said guide element 42 ever being extracted from the space existing between both layers of the folded flexible band 1.

Figure 3:
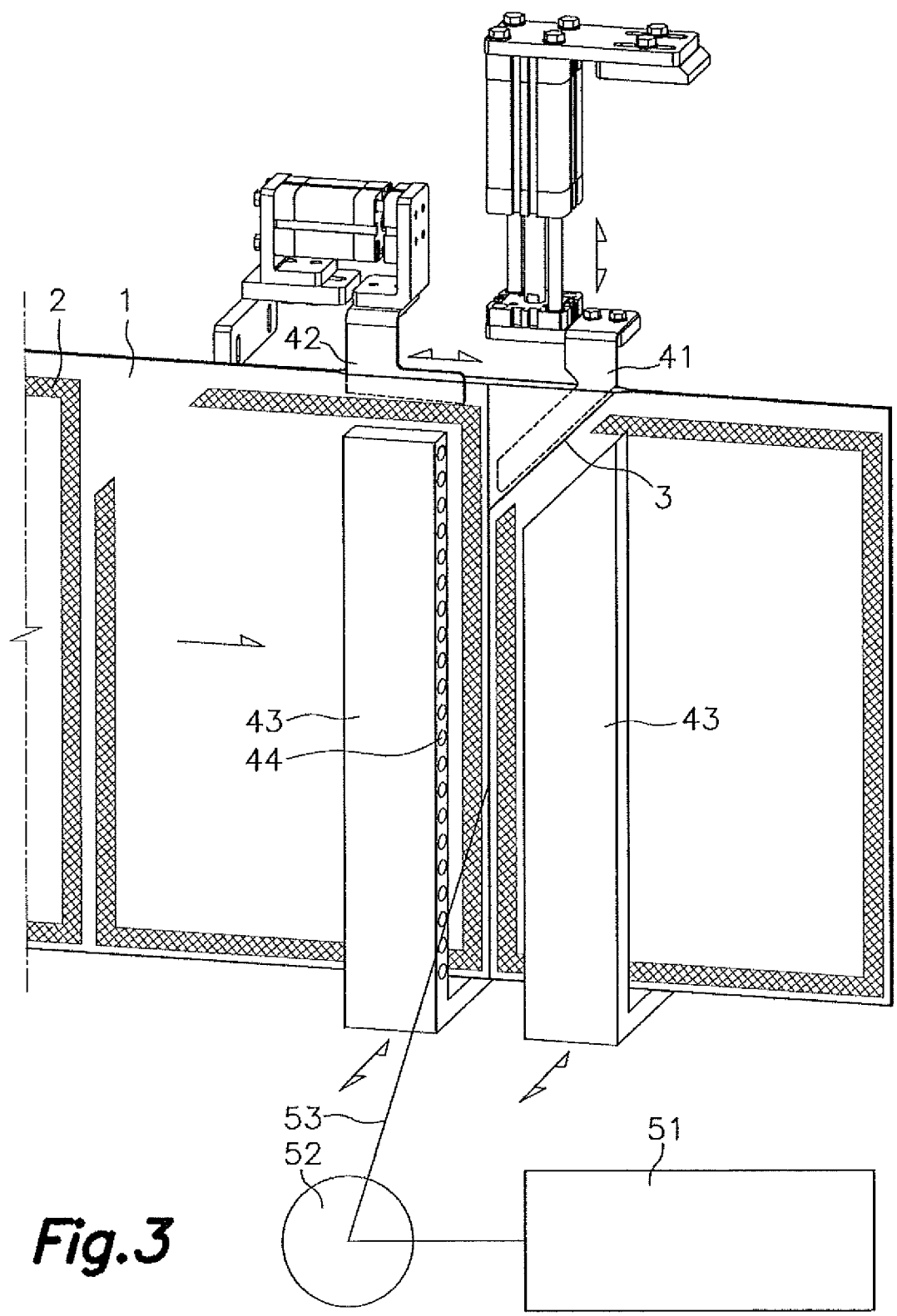
FIG. 3 shows a perspective view of the proposed cutting unit provided with a separator element, a guide element, two immobilizing clips with blow openings and a laser cutter.

The separator element 41 is in turn movable in a vertical direction perpendicular to the forward movement direction of the flexible band operated by a piston or linear motor (see FIG. 3) and has a flat coplanar with the folded flexible band 1.

When a new portion of the folded flexible band 1 corresponding to a new flexible package is placed in the cutting area by means of the movement thereof in the forward movement direction, the guide element 42 is moved in that same direction accompanying the movement of the flexible band 1. When said movement of the flexible band 1 stops, the immobilizing clips 43 close around the cutting area immobilizing the flexible band 1, pressing it from opposite sides, fixing its position to carry out the tasks of cutting in a precise manner.

The guide element 42 will be stopped with an end thereof adjacent to the area where the separator element 41 will be inserted between the two layers of the folded flexible band 1, separating the two side edges of the flexible band, making it easier for said separator element 41 to be correctly inserted. The separator element 41 is then inserted in a downward direction, maintaining the separation of the opposite layers of the flexible band 1 between which it will be interposed.

Next, in sequence, the guide element 42 is moved away until it is arranged outside the cutting area by means of the movement thereof in a direction opposite the forward movement direction of the flexible band 1.

The emitting unit 51 for emitting laser light is then connected and the directional device 52 aims the emitted laser light beam 53 on the cutting area, reproducing the desired cutting line pattern, cutting it and separating the flexible package from the rest of the folded flexible band 1. Since at least one edge of the separator element 41 is arranged next to the cutting line in the fill opening area 3, the layers of the flexible band 1 are prevented from being welded together in said area.

During said cutting operation, the blow openings 44 carry a gas stream to the cutting area, preventing the occurrence of flame.

The immobilizing clips 43 are then released and the produced flexible package is extracted from the cutting area, for example, by means of a system consisting of movable clips that hold each new flexible package that has been produced and transfer it to a fill line.

The operation cycle is restarted thereafter by moving a new portion of the folded flexible band 1 corresponding to a future new flexible package to the cutting area.

What is claimed is:
1. A flexible package-forming machine for horizontal packaging by folding and welding a flexible band with a first and a second faces, comprising, in this order with respect to a forward movement direction of the flexible band, at least:

one unwinding unit for unwinding the flexible band in the forward movement direction;

one flexible band folding unit configured for folding the flexible band along at least one folding line parallel to the forward movement direction, arranging at least two portions of the first face of the flexible band, arranged on opposite sides of the at least one folding line, opposite one another;

one welding unit of the folded flexible band configured for making welding lines at least in a direction transverse to the forward movement direction of the flexible band;

at least one drive unit configured for moving the flexible band in the forward movement direction;

one laser cutting unit for cutting a cutting area of the folded flexible band to separate the portions making up flexible packages and to produce a fill opening cut determining a fill opening in each flexible package, the laser cutting unit including:

at least one laser emitting unit, for emitting laser light, located on one side of the folded flexible band;

a directional device for directing the laser light against the cutting area;

at least one immobilizing clip configured for pressing along a portion of the folded flexible band adjacent to the cutting area for the immobilization thereof;

a separator device including an insertable separator element movable in a vertical direction, not parallel to the forward movement direction of the flexible band, between an extracted position, in which the separator element does not interfere with the welding lines of the flexible band in the movement thereof in the forward movement direction, and an inserted position adapted to keep the opposed two portions of the first face of the flexible band separated in the fill opening during the fill opening cut, in the inserted position the separator element being interposed between the opposite two portions of the first face of the folded flexible band, adjacent to the fill opening and inserted between edges of the flexible band farthest away from the folding line, a programmable control device controlling the movement of the directional device and the actuation of the laser emitting unit for emitting laser light in coordination with the movement of the separator device to separate the opposite faces of the flexible band during cutting operations to prevent the fusion thereof.

2. The machine according to claim 1, wherein the separator device further includes a guide element inserted between the opposite two portions of the first face of the folded flexible band in an area adjacent to the edges of the flexible band farthest away from the folding line, causing the separation of the opposed two portions of the first face of the folded flexible band to make the insertion of the separator element between the opposite two portions of the first face of the flexible band easier.

3. The machine according to claim 2, wherein the guide element is movable in a direction parallel to the forward movement direction of the flexible band between an insertion position in which one end of the guide element is adjacent to the separator element and in which at least part of the guide element coincides with a cutting area, and a cutting position in which the guide element is spaced apart from the cutting area.

4. The machine according to claim 1, wherein the separator element is movable in a direction perpendicular to the forward movement direction of the flexible band.

5. The machine according to claim 1, wherein the at least one immobilizing clip supports gas ducts connected to blow openings aimed at the cutting area.

* * * * *